United States Patent [19]

Langston

[11] Patent Number: 4,669,705
[45] Date of Patent: Jun. 2, 1987

[54] APPARATUS FOR PULLING LONG RUNS OF FIBER OPTIC CABLE

[76] Inventor: Ralph C. Langston, 13588 SE. 152nd Ave., Clackamas, Oreg. 97015

[21] Appl. No.: 818,117

[22] Filed: Jan. 10, 1986

Related U.S. Application Data

[62] Division of Ser. No. 648,757, Sep. 7, 1984, Pat. No. 4,576,362.

[51] Int. Cl.$^4$ .............................................. H02G 1/08
[52] U.S. Cl. ......................................... 254/134.3 FT
[58] Field of Search ................ 254/134.3 R, 134.3 FT

[56] References Cited

U.S. PATENT DOCUMENTS

| | | | |
|---|---|---|---|
| 4,270,734 | 6/1981 | Straight | 254/134.3 R |
| 4,454,999 | 6/1984 | Woodruff | 254/134.3 PT X |
| 4,456,225 | 6/1984 | Lucas | 254/134.3 R X |
| 4,468,003 | 8/1984 | Nonclercq et al. | 254/134.3 FT |
| 4,502,666 | 3/1985 | Mattelon et al. | 254/134.3 FT |
| 4,508,281 | 4/1985 | Plater | 254/134.3 R X |

FOREIGN PATENT DOCUMENTS 827091  11/1951  Fed. Rep. of Germany  254/134.3 R Primary Examiner—Frederick R. Schmidt
Assistant Examiner—Steven P. Schad
Attorney, Agent, or Firm—Marger & Johnson

[57] ABSTRACT

A fiber optic cable pulling method and apparatus includes a series of large-diameter capstan winches placed at intermediate access points along the conduit through which the fiber optic cable is to be pulled. Each capstan winch pulls a portion of the cable through a segment of the conduit at a substantially uniform velocity. The capstan wheel of each winch is sized frictionally to engage the cable without exceeding its minimum bending radius. The winches are independently controlled by controllers which limit the rate of hydraulic fluid and its pressure flowing to the hydraulically powered winch, and thereby maintain pulling tension on each portion of the cable below a predetermined tension, if exceeded, which could damage the fiber optics in the cable. The capstan winches are spaced sufficiently close together so that the pulling tension necessary to pull a portion of cable through each conduit segment is ordinarily less than the tension provided by the capstan winches. If a portion of the cable catches in a segment of conduit, the winches cease pulling along the entire length of the cable.

9 Claims, 7 Drawing Figures

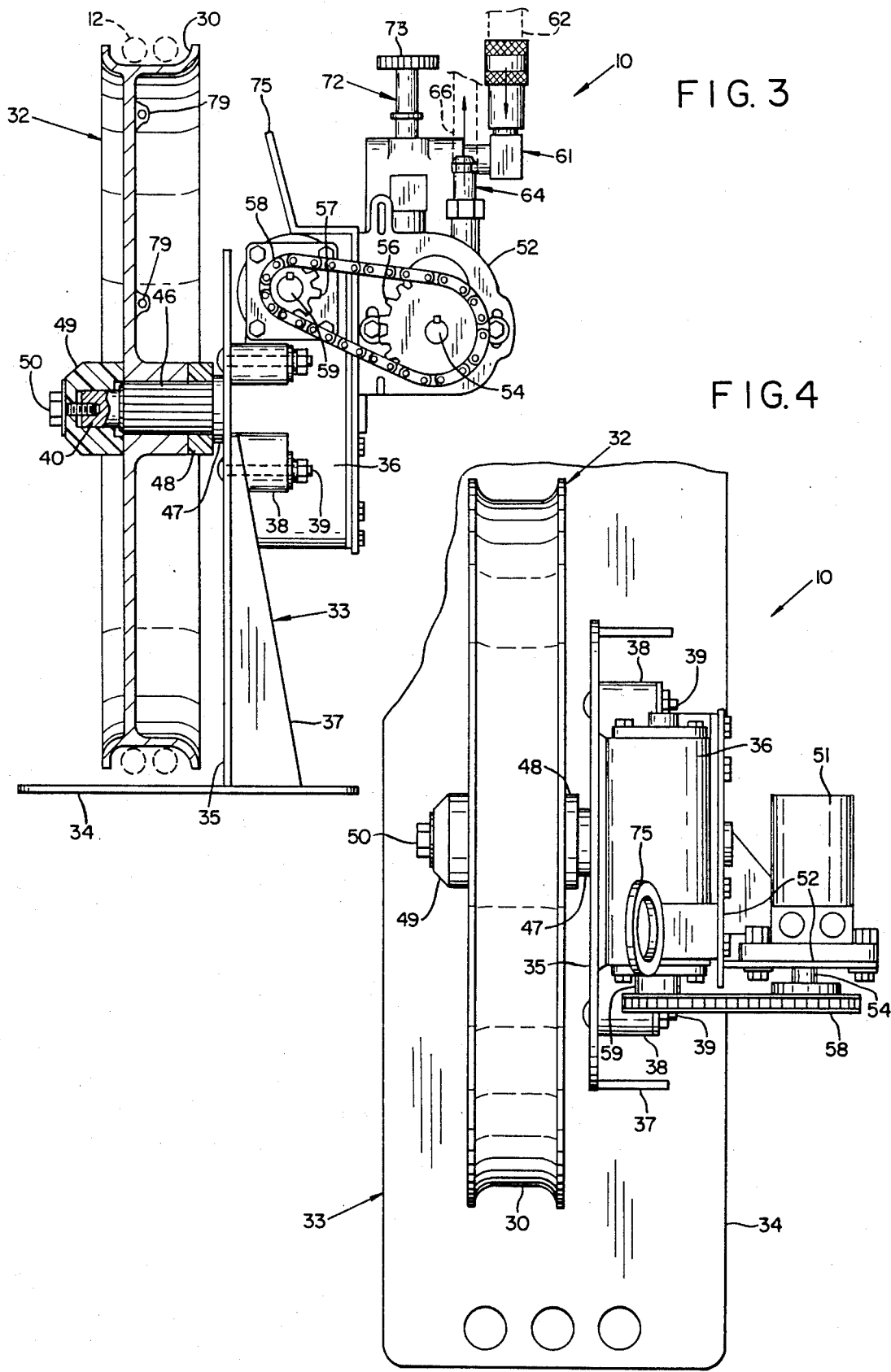

APPARATUS FOR PULLING LONG RUNS OF FIBER OPTIC CABLE

This is a division, of application Ser. No. 06/648,757 filed Sept. 7, 1984, now U.S. Pat. No. 4,576,362, issued Mar. 18, 1986.

BACKGROUND OF THE INVENTION

This invention relates to method and apparatus for laying underground cable and more particularly to pulling long runs of fiber optic cable through underground conduit.

Fiber optic cable is composed of a bundle of long, thin fibers of glass, plastic or other transparent material, closed within a protective sheath. Encoded light pulses carrying audio and video signals are sent through the fiber much like electric current travels along a wire. The advantage of fiber optic cable over conventional cable lies in its transmission characteristics. Because of the fiber's thinness and superior attenuation characteristics, a fiber optic cable can carry a much higher rate of information over many more channels than a comparably sized wire cable.

However, fiber optic cable is more difficult to lay than conventional cable. It lacks the tensional strength of conventional wire cable and will fracture at a much lower pulling tension. Furthermore, because of its construction, fiber optic cable is relatively inflexible. Typically, the fibers are bundled in a spiral fashion around a stiff steel support wire within a hard plastic protective sheath. Bending of the cable beyond a limited range can break the fibers within.

Because of these material drawbacks, conventional pulling methods and apparatus have proven inadequate for pulling more than a relatively short length of fiber optic cable through an underground conduit. These methods usually comprise placing a single winch at the conduit exit, passing a pull rope attached to the fiber optic cable through the conduit to the winch, and operating the winch to pull the rope and cable through the conduit until the rope is completely wound on the winch and the cable reaches the conduit exit. Pulling a cable in such a manner requires considerable tension to overcome the frictional drag of the cable along the conduit surface. The winch pulling tension necessary to overcome this drag quickly increases as the length of pull increases. Typically, no more than 2,000 feet of cable can be pulled before the winch tension exceeds the cable's tensional limit. (However, the length of pull varies with the condition of the conduit.) In contrast, many times that length of wire cable can be pulled without the cable breaking.

The extra pulling requires more time and manpower in moving the winches and setting up the apparatus. Moreover, connecting the relatively short lengths of fiber optic cable adds substantial additional cost to installation of the cable. Each connection demands expensive and time-consuming splicing. The extra splicing in turn creates resistance to the transmitted light pulses which must be overcome by the installation of additional signal repeaters along the cable to boost the signal strength.

To increase the maximum continuous length of fiber optic cable which may be pulled, several techniques have been developed. In one approach., a tensiometer is incorporated into the conventional winch to limit the pulling torque of the winch to an amount below the tensional strength of the fiber optic cable. The winch ceases to pull if the tension needed to pull the cable through the conduit exceeds the preset torque limit of the winch. If the cable is between conduit access points at the time the winch stops, it is withdrawn until its end rests at an access point. A new section of cable is then inserted and the process repeated. Although this technique assures the winch will not pull the cable with excessive tension, it is little more than a fine tuning of the conventional pulling method and does.not significantly increase the pulling length of cable.

A second technique doubles the continuous length of cable that can be pulled by pulling the cable from both ends of its storage spool, one end in each direction. With the spool positioned at an intermediate access point in the conduit, one end of the cable is pulled in one direction and the other end is pulled in the opposite direction. Under typical conditions, the length of pull is about 4,000 feet.

A third approach encompasses a series of pulls and stores which further increase the pulling length. The cable is first pulled from its storage spool at an intermediate conduit access point 2,000 feet from an entry point of access to the conduit. Rather than stopping at that point where the cable reaches the winch, however, the cable is manually pulled out of the conduit until an additional 2,000 feet are pulled through the conduit. As the cable emerges from the conduit, it is stored on the ground in a FIG. 8 pattern sufficiently sized to avoid unduly bending the cable. After 2,000 feet are stored aboveground, the cable end is then reinserted into the conduit, and the stored cable is pulled to another access point. At the spool, a third 2,000-foot length is spooled off into another FIG. 8 pattern on the ground. The cable is then severed from the spool, its end inserted into the conduit, and the stored cable is pulled in the opposite direction to a third access point. In this way a 6,000-foot run of fiber optic cable can be pulled into a conduit with splicing.

These methods of pulling fiber optic cable, although improvements over the conventional pulling method, can lay but relatively short lengths of cable. Only with the third approach is it possible to pull significantly longer lengths, but the labor cost of handling, storing, and pulling soon outweigh the benefit of an additional increment of length. And all these methods still require significantly more splices and signal repeaters than are required in pulling wire cable.

Accordingly, the need remains for a method and apparatus for pulling long runs of fiber optic cable quickly and efficiently.

SUMMARY OF THE INVENTION

An object therefore of the present invention is to improve the pulling of long continuous runs of fiber optic cable through an underground conduit without the drawbacks of prior cable-pulling techniques.

A second object is to minimize the need for splicing and signal repeaters in laying long runs of fiber optic cable.

A third object is to minimize the labor required to lay continuous long runs of fiber optic cable.

Another object is to provide an inexpensive and reliable apparatus for pulling fiber optic cable in underground conduit that is easily installed and operated.

A further object is to pull fiber optic cable through underground conduit without unduly bending the cable or exceeding its tensional breakage limits.

The present invention is a method and apparatus for pulling a long run (e.g., 10,000 meters or more) of fiber optic cable through underground conduits in a continuous unbroken length from a conduit entry to a conduit exit. Under the method, a spool of the fiber optic cable is first placed at the conduit entry. At one or more selected intermediate access points spaced along the conduit, a capstan winch means is aligned with the conduit for pulling the cable therethrough. The capstan winch means is designed and operated to pull the cable at a predetermined velocity and tension. At a conduit exit, a second or rope pulling means, which can be another of the foregoing capstan winch means, is placed for pulling a pull rope attached to the cable to the exit and preferably directing it out of the conduit to the surface. With the winches and rope-pulling means in place, a conventional pull rope is extended in conventional fashion from the conduit entry through the conduit to the conduit exit, passing through each intermediate access point. The rope is connected to the lead end of the fiber optic cable at the conduit entry and to the rope-pulling means at the exit. The rope is then mounted on each capstan and pulled taut. To pull the cable, the capstan winch means and the rope-pulling means are operated simultaneously to pull the cable continuously along its length from the conduit entry through the conduit to the exit at a substantially uniform velocity and at a tension in each conduit segment not exceeding a predetermined amount.

The capstan winch means are spaced sufficiently close together along the length of the conduit to limit the tension applied to each length of the cable as it is relayed through the conduit to an amount below its damage threshold. To allow for optimum placement at the access points, each capstan winch means is independently driven and controlled. Each capstan winch means includes a large diameter wheel or drum around which the rope and cable wind as they are pulled through the conduit at a predetermined rotational velocity and at a maximum pulling torque. Each wheel is sized to a radius not less than the minimum bending radius of the fiber optic cable.

In a preferred embodiment, the capstan winch comprises a gear reduction mechanism driven by a hydraulic motor, the mechanism supportedly mounted to a capstan mounting bracket. A shaft of the gear mechanism extends through the bracket to mount a flanged narrow width, large diameter wheel defining the capstan. The hydraulic motor is operatively connected to the gear mechanism through a series of sprockets and connecting chain. Operation of the hydraulic motor is controlled by a separate controller which directs the hydraulic flow, permitting the capstan winch to pull in either direction or to shut off. The controller includes means for limiting the flow of hydraulic fluid to the hydraulic motor and thereby controlling the rate at which the capstan winch pulls the cable. The controller also includes means for limiting the pressure of the hydraulic flow to the hydraulic motor. By controlling the fluid pressure, the pulling torque of the capstan can be controlled and limited to an amount below that which will damage the fiber optic cable. The gear reduction mechanism is proportioned to the capstan to provide a low circumferential pulling speed and the resultant increased torque is controlled by the controller.

The present invention offers significant advantages over conventional pulling techniques. The series of capstan winches placed at intermediate access points along the conduit limit the tension on the cable in each conduit segment to an amount below its damage threshold. With such a system, great lengths of cable may be pulled without the need for frequent splicing or additional signal repeaters to overcome the resistance of the splices. Pulling the cable requires much less manpower and time than by conventional methods. Risk of damage to the cable is minimized by each capstan winch means pulling, in effect, only a short length (e.g., 2,000 foot) of a much longer, continuous cable. If the cable hangs up in one portion of the conduit, the downstream winch means ceases pulling when torque exceeds the limit preset below the damage threshold of the cable. The upstream capstan winch means also ceases pulling cable when the downstream tension is relieved, but continues to turn. This effect makes it easy for workers to determine easily in which portion of the conduit the cable has hung up.

The foregoing and other objects, features, and advantages of the invention will become more apparent from the following detailed description of a preferred embodiment which proceeds with reference to the accompanying drawings.

BRIEF DESCRIPTION OF THE DRAWING

FIG. 3 is a side elevational view of the capstan winch of FIG. 2, with the capstan shown in cross section.

FIG. 4 is a top plan view of the capstan winch.

DETAILED DESCRIPTION

General Arrangement

Figure 1:
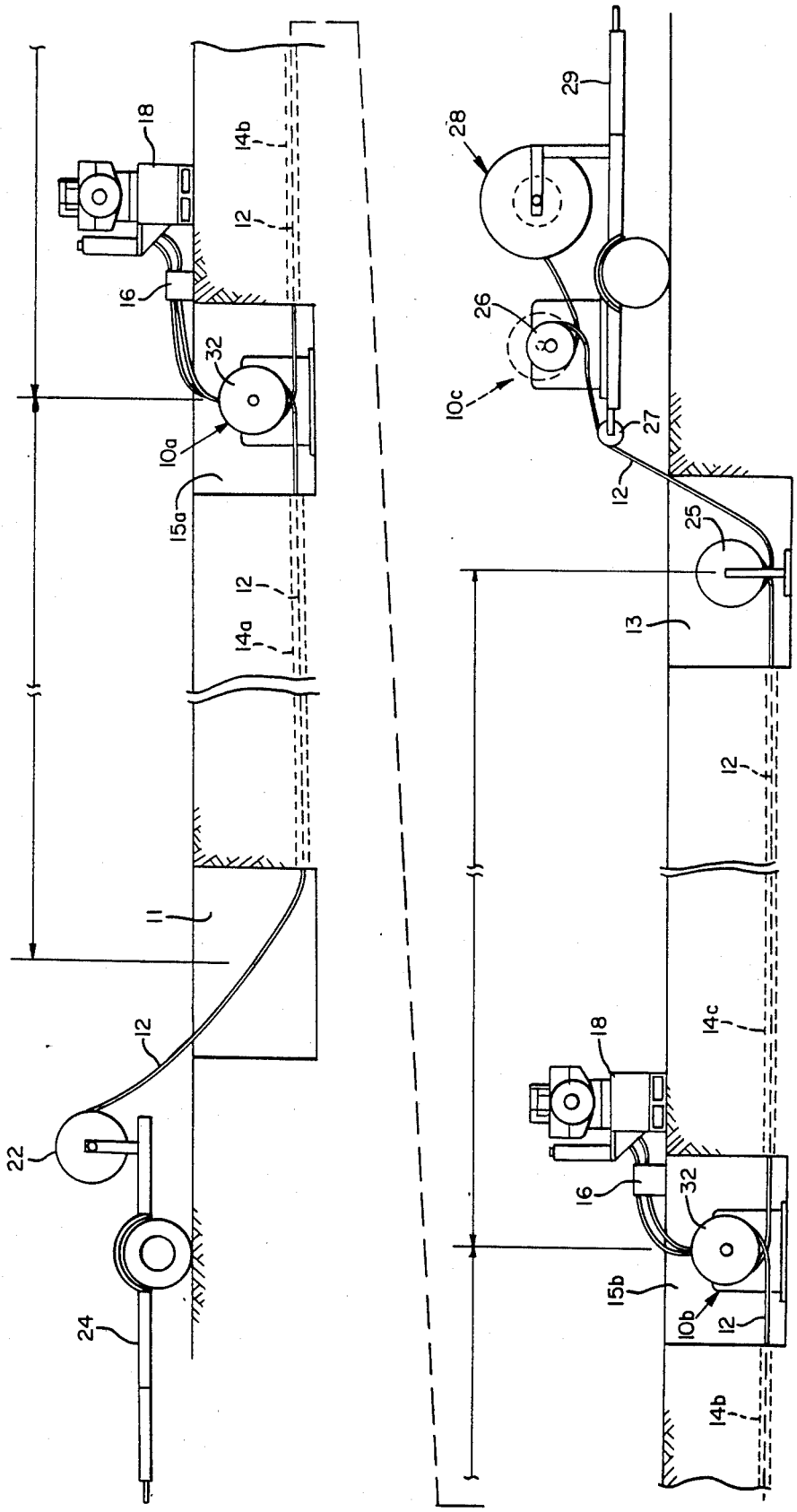
FIG. 1 is a schematic view of a system in accordance with the invention for pulling fiber optic cable through an underground conduit.

Referring to FIG. 1, the invention includes a series of capstan winches 10a, 10b for pulling a continuous fiber optic cable 12 through an underground conduit 14 from an entry point or manhole 11 to an exit point or manhole 13. Winches 10 are placed within selected intermediate access points or manholes 15a, 15b. The intermediate manholes are spaced closely enough together along segments 14a, 14b, 14c of the conduit that the pulling torque of each winch 10 necessary to pull the cable through each segment is below the tensional damage threshold of the cable. In general, the spacing varies inversely with the frictional resistance of the cable within each conduit segment. Under most conditions, the access points should be spaced about 2,000 feet apart.

The cable 12 is fed into the conduit 14 from above ground at the entry manhole 11 and pulled from the conduit at the exit manhole 13. A storage spool 22 from which the cable is wound is positioned beside entry point 11 on a trailer or truck 24 or other mobile support means. At conduit exit 13, a bull wheel 25 or other alignment means is placed within the manhole to relay the cable 12 upward as it is pulled through and out of the conduit 14 by a conventional rope winch 26 mounted between an idler roller 27 and a take-up reel 28 on a second trailer or truck 29 adjacent the exit point 13. Alternatively, if the fiber optic cable is to be spooled onto the take-up reel, a capstan winch 10c can be used instead of winch 26c.

Figure 5:
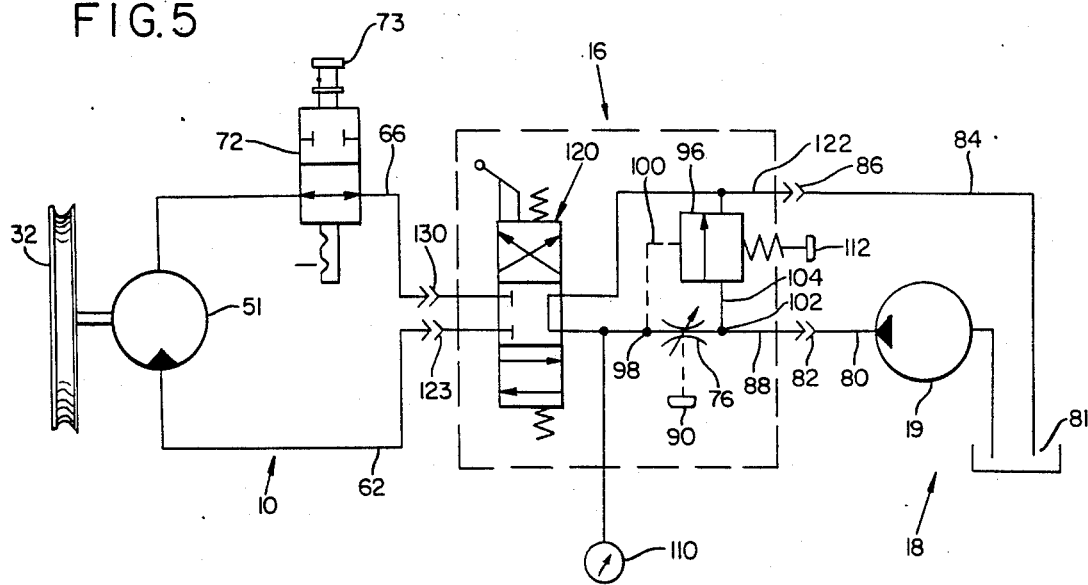
FIG. 5 is a schematic view of the controller, hydraulic pump and fluid circuit for driving the hydraulic motor of the capstan winch of FIGS. 1 and 4.

Each capstan winch 10 is powered independently to permit their placement at optimally spaced intermediate manholes 15. The winches 10a, 10b are each separately controlled by controllers 16 which operate so as to pull the cable at a substantially uniform velocity through the conduit at up to a predetermined tension set below the tensional limit of the cable. Separate hydraulic power units 18 power each winch 10. Each power unit includes a motor- or engine-driven hydraulic pump 19 (FIG. 5).

The series of winches 10 pulls the cable 12 and winch 26 pulls the rope at several points along the conduit 14 simultaneously. By pulling sections of cable in this manner, a continuous cable of great length can be pulled. How the winches operate will be described below.

The Capstan Winch

Figure 2:
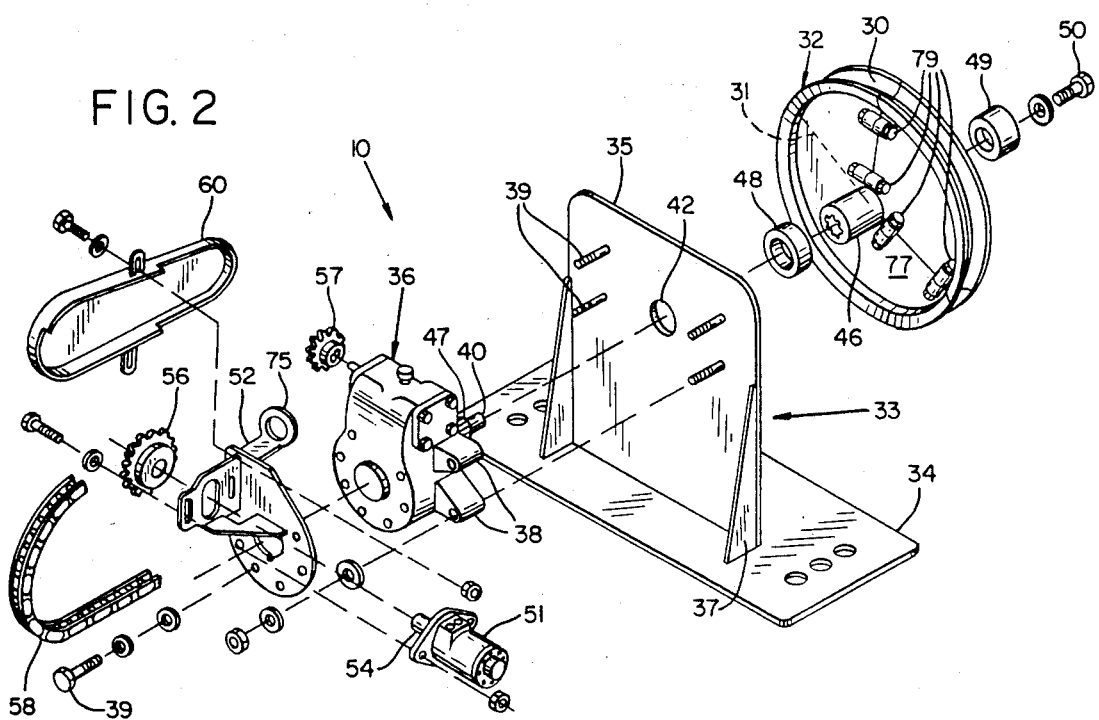
FIG. 2 is a an exploded view of a capstan winch used in the system of FIG. 1.

Referring to FIGS. 2-4, the capstan winch pulls the cable by continuously winding a couple of cable coils on and off the circumferential surface 30 of a narrow, flanged wheel or drum 32 as the wheel turns. The wheel is composed of a strong, lightweight material such as stainless steel or cast aluminum.

The wheel radius 31 is sized to produce a wheel curvature large enough to avoid bending the fiber optic cable beyond its bending limit, normally specified by the cable manufacturer as a minimum bending radius. The bending radius is often given as some multiple of the cable diameter. For example, a one-inch diameter cable having a bending radius of 10 can be wound on a wheel having a radius of at least 10 inches or a diameter of 20 inches. Interchangeable wheels with diameters of 18, 24, 30, and 36 inches are used to capstan cables of various common sizes.

A winch bracket 33 supports the wheel 32 so that it may turn in the desired manner. The winch bracket 33 includes a bracket base plate 34 to which a perpendicular upright plate 35 is welded and braced by gussets 37. A gearbox 36 is connected via mounting ears 38 and bolts 39 to the plate 35. Within the gearbox is a reducer gear train which drives a splined output shaft 40. The shaft extends through an aperture 42 in the plate 35 into an internally splined hub 46 of the wheel 32. The wheel is thus rotationally mounted to the shaft 40. An annular spacer 48 is fitted onto the shaft 40 between the hub 46 and a shoulder 47 of the shaft 40. The wheel is secured to the shaft 40 by an end cap 49 through which a threaded cap screw 50 extends axially into the shaft. Both spacer 48 and cap 49 are formed of a resilient, durable material such as nylon.

Corresponding to each wheel diameter is a different bracket 33, each having an upright plate 35 of a different height to maintain sufficient spacing between the wheel and the bracket base 34 for the cable to pass. Each bracket is sized to accommodate a different sized wheel yet maintain the lower rim of wheel 32 a predetermined distance from bracket base 34. Changing wheel size requires unbolting bolts 39 from ears 38 on gearbox 36 and removing wheel 32 by removing screw 50 and end cap 49. The procedure is reversed after insertion of the new bracket and wheel. Alternatively, a single bracket with several vertically spaced holes for adjustably mounting the gearbox 36 can be used with different diameter wheels.

The gearbox 36 and in turn the wheel 32 are driven by a high-speed, low-torque hydraulic motor 51 adjustably mounted on secondary bracket 52 bolted to a side of the gearbox 36 opposite the shaft 40. Bracket 52 is generally L-shaped in top view (FIG. 4) for mounting motor 51 with its output shaft 54 normal to gearbox output shaft 40. A sprocket 56 keyed to shaft 54 is aligned with a sprocket 57 keyed to a gearbox input shaft 59 extending from the side of the gearbox 36 and parallel to shaft 54. The two sprockets are operably connected by a chain 58, all enclosed within a protective housing 60, to transfer the power of the motor to the gearbox.

To maintain the desired pulling torque on the cable 12, the rotation rate of the wheel 32 is adjusted with respect to its diameter. Typically, it is desired that the wheel pull the cable between 45 and 200 feet per minute, depending upon the conduit resistance which must be overcome. If a larger diameter wheel is installed, sprockets 56, 57 are changed to reduce the wheel's rotation rate. Conversely, different sized sprockets are installed to increase the rotation rate for a smaller diameter wheel.

Figure 7:
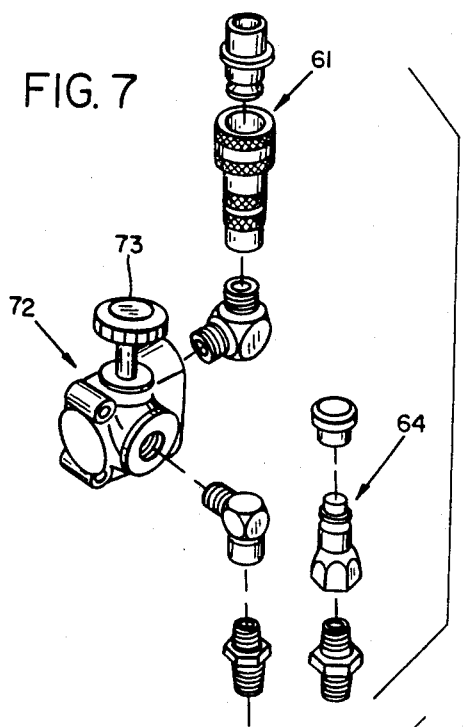
FIG. 7 is an exploded view of a cutoff valve and fittings for delivering fluid to the hydraulic motor in the circuit of FIG. 5.

Referring to FIGS. 3 and 7, the hydraulic motor 51 has a female connector 61 and a male connector 64. The motor is connected thereby into the hydraulic drive circuit of FIG. 5 to receive hydraulic fluid from line 62 and to return the fluid to line 66. To shut off the flow of fluid to the motor 51, a two-position shutoff valve 72 is mounted atop the motor, shown in relation to the connectors 60, 64 in FIG. 3 and in the exploded view of FIG. 7. A plunger 73 of valve 72 is pushed down to block the flow of hydraulic fluid through line 66 to the motor and thereby stop the winch 10 from operating.

Atop motor bracket 52 is a lifting eye 75 for lifting the winch 10 into and out of the intermediate access points 15 (FIG. 1). Often these access points will be existing manholes having a diameter less than the diameter of the larger wheels used for pulling thicker fiber optic cable. To overcome this barrier, the wheel 32 can be cast with a removable pie-shaped wedge 77, shown in FIGS. 2 and 3, which is removed when the winch is put into or taken out of a manhole and then reattached by means such as bolts 79.

The Capstan Drive Arrangement

The capstan drive arrangement controls the pulling torque and rate of rotation of the capstan winch. FIG. 5 shows a schematic view of the capstan drive arrangement. It includes the hydraulic pump 19 which delivers hydraulic fluid under constant pressure and the controller 16 which controls the pressure and rate of flow of the fluid to the capstan winch.

Controller 16 appears in the center of the schematic (outlined in dotted lines) with the power unit 18 including hydraulic pump 19 and tank 81 depicted on the right and the capstan winch drive motor 51 of winch 10 shown on the left.

Referring to the pump 19, an output or high pressure line 80 connects the pump to inlet port 82 of the controller 16. The pressurized fluid is pumped through line 80 and into the controller at this port. A return line 84 connects to outlet port 86 of the controller to return fluid to the tank. Pump 19 is driven by conventional means (not shown).

Figure 6:
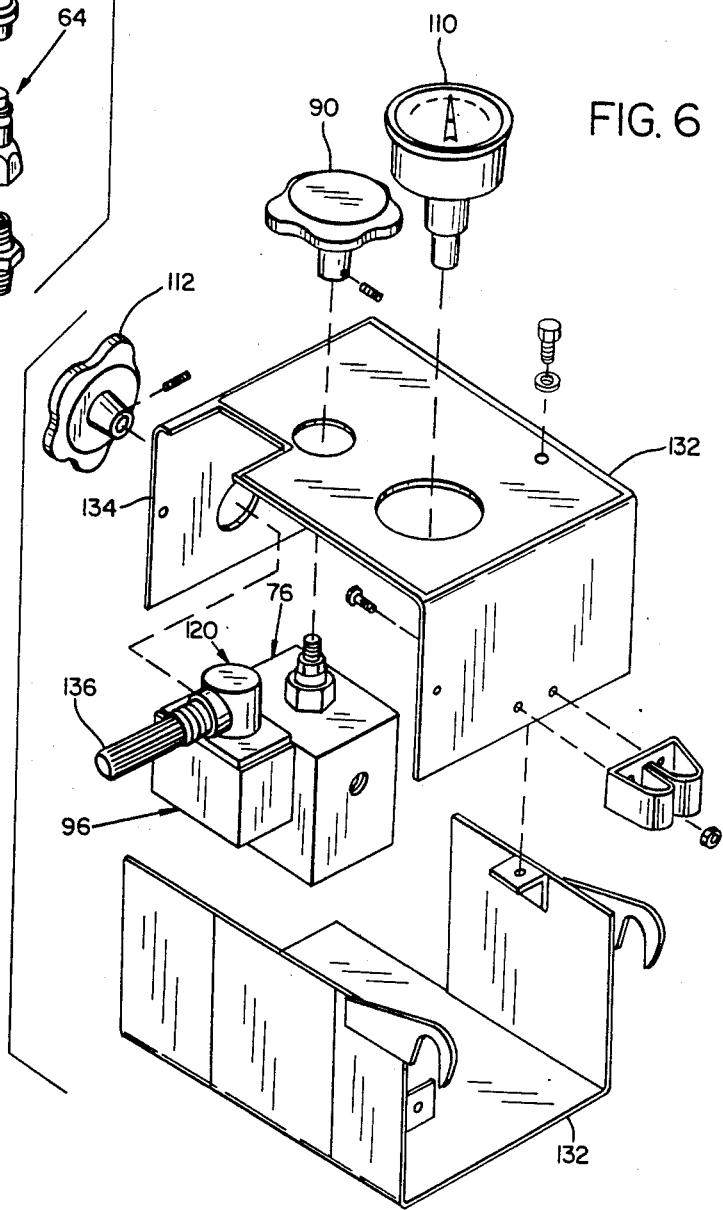
FIG. 6 is an exploded view of the capstan winch controller of FIG. 5.

Within the controller are several adjustable valves to regulate the flow speed and pressure of the hydraulic fluid to the capstan winch. Referring to FIGS. 5 and 6, the controller includes a speed control valve 76 which is adjustable to limit the flow of hydraulic fluid from the pump 19 to the motor 10. Valve 76 is positioned along internal line 88 which connects to inlet port 82. By adjusting handle 90, the operator can constrict or expand the throat of the valve and thereby control the flow of hydraulic fluid through line 88. The flow determines the rate at which wheel 32 rotates and hence the velocity at which the cable moves through the conduit.

To control the pressure of the fluid flow through valve 76 to the winch 10, a pressure control valve 96 selectively shunts a portion of the fluid back to the tank 81. Valve 96 connects to line 88 at a node 98 between valve 76 and the winch via check line 100. Through line 100, the pressure of the fluid delivered to the winch is also brought to bear on valve 96. When that pressure exceeds the adjusted bias on valve 96, the valve opens to shunt the fluid upstream of flow control valve 76 through a shunt line 104 connected to line 88 at a node 102. In this manner, less fluid is forced through valve 76 and the pressure of the fluid pumped to the winch 10 drops. The lower pressure and fluid flow to motor 51 decrease the pulling torque and speed, respectively, of the winch 10.

The pressure of the fluid in line 88 is measured (in pounds of pull) by a gauge 110. By monitoring the gauge, the operator can adjust the maximum pressure of the fluid powering the winch by turning a handle 112 on the pressure control valve 96 to cause the valve to open at the desired pressure and thereby limit the pulling torque of the winch to a tension below the damage threshold of the cable 12.

The controller also includes a manual three-position directional valve 120 for controlling the direction of the fluid flow into the winch 10 and for shutting off the flow entirely. In the neutral position shown in FIG. 5, fluid in line 88 is routed through valve 120 into return line 122 which connects to the outlet port 86. With the valve 120 shifted to its lower setting indicated by parallel arrows, the fluid flows through it and a port 123 in a forward direction to the winch motor 51 via connecting line 62. The fluid returns to the controller from the winch motor through line 66 to a port 130. From the port 130, the fluid flows through the valve 120 to internal return line 122. When shifted to its upper setting indicated by crossed arrows, the valve 120 directs the fluid in line 88 into line 66 to flow the opposite way through the winch motor and back to the controller through line 62 to return line 122. The change in flow direction changes the direction of rotation of wheel 32 and hence the direction of cable pull.

The shutoff valve 72 is located in line 66 between the winch motor 51 and port 130. The valve 72 on the winch motor and valve 120 on the controller allow the winch to be stopped at two different locations, that is, either at the power unit or in the manhole.

FIG. 6 shows a specific embodiment of the controller. Valve 76 is controlled by knob 90 from the top of enclosure 132. Gauge 110 is also located atop the enclosure for easy viewing. Pressure control valve 96 is accessible by its knob 112 extending from a side 134 of the enclosure. Directional valve 120 is controlled from the front of the enclosure by a lever 136.

Operation

Referring to FIG. 1, the capstan winches 10a, 10b (and any number of additional winches as needed) are placed at appropriate access points 15 along the conduit 14 spaced such that the tension necessary to pull the cable does not exceed the cable's tensional limit. The spacing varies with the acceptable pulling tension on the particular cable, normally specified by the cable manufacturer and typically around 600 pounds. The winches are set to pull at up to a predetermined maximum tension well below the limit, in the range of 200–300 pounds, to assure an adequate margin of safety. The distance between the access points 15a, 15b chosen depends in large part on the cable drag, which varies with the surface and linearity of the conduit. In practice, the capstan winches 10a, 10b have been placed more than 2,000 feet apart without the pulling tension reaching the cable tension limit.

To begin, each capstan winch 10 is lowered into the appropriate access point with the selected wheel oriented in the direction of cable pull. To pull the cable through a straight portion of the conduit, the wheel is oriented vertically, as shown in the drawings. However, by shifting the bracket 33, the wheel 32 can be oriented at any angle to pull the cable around a bend in the conduit. If a wheel with diameter larger than the diameter of the access point 15 is required, wedge 77 is removed and reattached once the winch is positioned within the manhole.

The pull begins by passing a pull rope, tape or wire (not shown) through each segment of conduit 14 from the entrance 24 to the exit 25. An end of the pull rope is connected to a lead end of cable 12 at the storage spool 22. The pull rope is wound several times around wheel 32 at each winch 10 and around bull wheel 25 and pulled taut.

The cable must be pulled from downstream with sufficient tension that the it frictionally engages the circumferential surface 30 of the preceding the drum or wheel 32 or upstream winch. If the tension on the cable at the point where it leaves the preceding winch 10a is too low, that wheel 32a will spin beneath the cable windings. To assure that the cable is sufficiently taut to frictionally engage the upstream winch drums, the pulling tension of the following winch 10b should be higher than that of the preceding winch or winches. In practice, the last downstream winch 10b is preferably set to pull with about 25 pounds of tension more than the upstream winches.

Before the actual cable pull begins, each winch is set by its respective controller 16 to pull the rope and attached cable 12 at a substantially uniform velocity and at a pulling tension within the predetermined tensional limit of the cable. This is done through the following steps. First, valve 72 is closed to shut off the flow of fluid to the winch 10. Second, valve 76 is opened fully. Third, pressure control valve 96 is adjusted to open fully against any pressure. Fourth, directional valve 120 is shifted to either the forward or reverse flow direction to block the return flow to the pump through line 122.

The fluid then bears against valve 96 through line 100 and the flow is shunted through line 104. Valve 96 is then adjusted to increase the bias necessary to open the valve until the necessary pressure rises to the desired maximum pulling pressure. This can be read from gauge 110.

Valve 72 is then opened to operate winch 10. To adjust the rate of rotation of the wheel 32 of the winch, valve 76 is adjusted to regulate the rate of fluid flow to the winch.

With operators at each winch and at the conduit entrance and exit in communication with each other, the winches are started. The pull rope is pulled through the conduit and taken up on the power take-up reel 28 which also provides tension to winch 26 or 10c. The cable, following the rope, is pulled off the spool 22, down and through the conduit entry 11. Within the conduit 14, the cable 12 is relayed by winch 10a to winch 10b to the conduit exit 13 and pulled out of the conduit by winch 26 or 10c.

The winches self-regulate their rate of wheel rotation and torque on the cable to maintain the predetermined velocity and pulling tension within limits. If a following or downstream winch 10b is pulling at a slower than the preceding winch 10a, slack will develop in the cable 12. Eventually, as the cable loosens its frictional engagement with the surface 30 of the preceding winch 10a, winch 10a ceases pulling the cable, although it continues turning the wheel 32. The slack is then picked up by the following winch 10b, which is still pulling, until the coil of cable tightens onto the wheel of the preceding winch 10a so that frictional contact is again made.

On the other hand, if winch 10b is pulling at a rate significantly greater than the winch 10a, tension on the cable increases at winch 10b as the cable tautens. Upon reaching the preset pressure limit, winch 10b stops pulling so as not to damage the cable 12. As more cable is provided by winch 10a, the tension on the cable slackens and winch 10b will once again pull the cable. A workman observing this action can adjust the controller of winch 10b so that its pulling speed matches that of upstream winch 10a.

This self-regulation is facilitated by the operation of the controller 16. As the cable resistance in the conduit rises, a greater amount of fluid pressure is required to overcome it and turn the wheel 32. The resistance of the wheel 32 increases relative to the resistance of the speed control valve 76, causing the constant hydraulic pressure within the capstan drive arrangement to increase across the capstan winch 10 and decrease across the valve 76. The inceased resistance overall decreases the flow rate and rotation rate of the wheel. When the pressure rises across the winch 10 to the bias setting of valve 96, the valve opens to shunt fluid away from the winch motor 51, effectively limiting the pressure to that setting. The winch 10 still turns but at the slower rate, stopping if the cable resistance increases further. If the cable resistance decreases because slack develops upstream, the fluid pressure across the winch decreases and valve 96 closes. The winch 10 then turns at a faster rate as the fluid flow rate increases through motor 51.

With this embodiment of the present invention, a continuous fiber optic cable over five miles in length has been laid without damage, and potentially greater lengths are possible.

In the embodiment illustrated, the cable is pulled until it reaches the surface of the exit 13 and before it winds around the conventional winch 26. But the method is not so limited. Alternatively, another capstan winch 10c could be mounted in place of the conventional winch 26 and act in cox'bination with the bull wheel 25 to pull the cable out of the conduit and wind it onto an appropriately-sized take-up reel 28. This may be useful, for example, if an end portion of the cable is to be relayed into a tall building. Storing an end portion of pulled cable on the reel 28 avoids the need for a splice at the conduit exit. In another variation, the capstan winch could be driven by a direct-current electric motor through electrical circuitry analogous to controller 16 to provide control of pulling speed and torque.

Having illustrated and described the principles of the invention in a preferred embodiment, it should be apparent to those skilled in the art that the invention can be modified in arrangement and detail without departing from such principles. Although the above embodiment of the invention pertains to the pulling of cable through underground conduit, the invention may be used to pull cable aerially as well. I claim all modifications coming within the spirit and scope of the following claims.

I claim:

1. A system for pulling fiber optic cable through an underground conduit having an entry, an exit, and at least one intermediate access point dividing the conduit into segments of a length such that fiber optic cable can be pulled through each segment without damaging the cable, the system comprising:
    a continuous length of fiber optic cable having a lead end, the cable having a minimum bending radius and a cable tensional limit;
    means for feeding the continuous length of fiber optic cable into the conduit entry;
    a pull rope connected to said lead end and extending through the conduit for pulling the calbe through the conduit from entry to exit via each access point;
    a pulling means connected to the pull rope at the conduit exit for pulling said pull rope and cable through a terminal segment of the conduit;
    a capstan winch means at each intermediate access point in the conduit for pulling the cable from the entry through each segment to the terminal segment of the conduit, the capstan winch means including a wheel rotating in a plane parallel to the direction of calbe pull;
    means for controlling the pulling means to pull the rope and cable through the terminal segment of the conduit at a first predetermined tension below the cable tensional limit; and
    means for controlling the rotational rate and pulling torque of the wheel of each capstan winch means for pulling the cable at a second predetermined tension below the cable tensional limit;
    the wheel comprising means defining a circumferential surface for frictionally engaging the cable to pull same, the surface having a width at least twice a diameter of the cable and a radius no less than the minimum bending radius of the cable;
    at least one turn of the fiber optic cable being wound around the capstan wheel without overlapping so that a minimum pulling tension exerted on the wound cable by the pulling means tightens the cable into frictional engagement against the circumferential surface of the rotating capstan wheel to pull the cable at said second tension and less than said minimum pulling tension slackens the cable wound on the wheel and allows the wheel to turn freely without applying said second tension to the cable.

2. A system according to claim 1 in which each capstan winch means and the pulling means is independently powered and controlled.

3. A capstan winch for pulling a long run of fiber optic cable having a minimum bending radius and a maximum tensional limit in cooperation with a remotely-located terminal winch means for pulling a lead rope connected to a lead end of the cable at a predetermined speed and tension, the capstan winch comprising:

a capstan wheel having a circumferential surface of a radius no less than a predetermined minimum bending radius of the cable to be wound around it;

mounting means for mounting the wheel to rotate;

rotating means for rotating the wheel to pull and wind the cable around the wheel and relay the cable onward toward the terminal winch means;

means for controlling the rotating means so as to apply to the cable up to a predetermined maximum pulling tension not to exceed the tensional limit of the cable; and adjustable means for controlling the rotating means to set the rotational speed of the wheel approximately to match said predetermined speed, the wheel being operable frictionally to engage the cable wound therearound to apply said pulling tension when said predetermined speed is at least as great as the rotational speed of the wheel and to disengage from the cable and cease applying said pulling tension while continuing to rotate when said predetermined speed is less than the rotational speed of the wheel;

the mounting and rotating means being connected to the wheel solely on one axial side thereof so that a full turn of the cable can be wound around the circumferential surface of the wheel without disassembling the capstan winch or cutting the cable;

the circumferential surface of the wheel having a width at least twice a diameter of the cable for said full turn of the cable to be wound around the circumferential surface without overlapping so that the frictional engagement of the cable on the wheel is determined by the relationship between said rotational and predetermined speeds; and the radius of the circumferential surface being a multiple of the cable diameter substantially greater than the width of said surface.

4. A capstan winch according to claim 3 in which the mounting means includes a bracket for mounting the wheel within a manhole for rotation in a plane parallel to the cable, the bracket having a base oriented normal to the plane of the wheel and spaced a predetermined distance from the periphery thereof for supporting the wheel and rotating means, the bracket and wheel being connected to the rotating means by a drive shaft on said one axial side of the wheel and a hub on the opposite side, the hub being detachable for mounting a second said wheel and a bracket of a different size on the rotating means.

5. A capstan winch according to claim 3 in which the rotating means includes a high speed motor operably connected to a gear reduction mechanism having an output shaft upon which the capstan wheel rotates, the gear reduction mechanism being operative for reducing rotational speed from the motor to rotate the wheel at a reduced rate and an increased pulling torque; the controlling means including means for limiting said pulling torque.

6. A capstan winch according to claim 3 in which the minimum radius of the circumferential is 10 times the cable diameter.

7. A capstan winch for pulling a long run of fiber optic cable having a minimum bending radius and a maximum tensional limit, comprising:

a capstan wheel having a radius no less than a predetermined minimum bending radius of the cable to be wound around it;

mounting means for mounting the wheel to rotate;

rotating means for rotating the wheel to pull and wind the cable onto the wheel and relay the cable onward; and means for controlling the rotating means so as to apply to the cable a predetermined maximum tension not to exceed a tensional limit of the cable, a circumferential portion of the wheel being radially removable so that the wheel can be disassembled to reduce the diameter thereof to pass through a manhole opening of a diameter smaller than the diameter of the assembled wheel.

8. A capstan winch according to claim 7 in which the mounting means includes a bracket means for mounting the wheel within the conduit for rotation in a plane parallel to the cable and the rotating means includes an output shaft upon which said wheel is mounted, the output shaft having one end supportably journaled in the bracket means and an opposite end which is free so that a coil of said cable can be readily wound upon and unwound from the wheel.

9. A capstan winch according to claim 7 in which the diameter of the wheel is in a range of 18 to 36 inches.

* * * * *

UNITED STATES PATENT AND TRADEMARK OFFICE
CERTIFICATE OF CORRECTION

PATENT NO. : 4,669,705

DATED : June 2, 1987

INVENTOR(S) : Ralph C. Langston

It is certified that error appears in the above-identified patent and that said Letters Patent is hereby corrected as shown below:

```
    Column 9, line 65, "cox'bination" should be --
combination--;
    Column 10, line 30, "calbe" should be --cable--;
    Column 10, line 40, "calbe" should be --cable--;
    Column 12, line 17, after "circumferential" insert
--surface--.
```

Signed and Sealed this

Thirty-first Day of May, 1988

Attest:

DONALD J. QUIGG

*Attesting Officer*     *Commissioner of Patents and Trademarks*